US010346420B2

(12) United States Patent
Sundaram

(10) Patent No.: US 10,346,420 B2
(45) Date of Patent: Jul. 9, 2019

(54) DATABASE INTEGRATION SYSTEM

(71) Applicant: SAP SE, Walldorf (DE)

(72) Inventor: P. Meenakshi Sundaram, Walldorf (DE)

(73) Assignee: SAP SE, Walldorf (DE)

( * ) Notice: Subject to any disclaimer, the term of this patent is extended or adjusted under 35 U.S.C. 154(b) by 500 days.

(21) Appl. No.: 15/168,091

(22) Filed: May 30, 2016

(65) Prior Publication Data
US 2017/0344592 A1 Nov. 30, 2017

(51) Int. Cl.
G06F 16/25 (2019.01)
G06F 16/27 (2019.01)

(52) U.S. Cl.
CPC .......... G06F 16/256 (2019.01); G06F 16/273 (2019.01)

(58) Field of Classification Search
CPC ......... G06F 17/30566; G06F 17/30578; G06F 16/256; G06F 16/273
USPC ....................................................... 707/615
See application file for complete search history.

(56) References Cited

U.S. PATENT DOCUMENTS

| 5,524,253 A * | 6/1996 | Pham ........................ G06F 9/46 703/27 |
| 7,523,130 B1 | 4/2009 | Meadway et al. |
| 7,631,132 B1 * | 12/2009 | Neuman ................. G06F 9/544 370/230 |
| 10,078,680 B2 * | 9/2018 | Yurchenko ........ G06F 17/30578 |
| 2004/0158842 A1 * | 8/2004 | Gilfix ...................... G06F 9/541 719/328 |
| 2005/0004952 A1 * | 1/2005 | Suzuki .................... G06F 9/466 |

(Continued)

OTHER PUBLICATIONS

Oracle Corporation, "Oracle8i Distributed Database Systems", https://docs.oracle.com/cd/A87860_01/doc/server.817/a76960/title.htm, Dec. 1999.

(Continued)

Primary Examiner — James Trujillo
Assistant Examiner — Jessica N Le
(74) Attorney, Agent, or Firm — Harness, Dickey & Pierce, P.L.C.

(57) ABSTRACT

The invention provides for a method of using a database assembly. The database assembly comprises at least three computing system. Each of the at least three computing systems comprises at least one application and a local database system. The database assembly further comprise a database integration system and a network connection between each of the at least three computing systems and the database integration system. The method comprises: receiving a first root transaction by the local database of a first computing system; executing the first root transaction on the local database of the first computing system; generating a first link transaction by the local database of the first computing system; sending the first link transaction from the first computing system to the database integration system via the network connection of the first computing system; generating a first routed transaction for at least one of the first remaining computing systems by the data base integration system; sending the first routed transaction to the at least one of the remaining computing systems via the network connection; and executing the first routed transaction on the local database of the at least one of the remaining computer system.

18 Claims, 8 Drawing Sheets

(56) References Cited

U.S. PATENT DOCUMENTS

| | | | | |
|---|---|---|---|---|
| 2012/0030184 A1* | 2/2012 | Driesen | ............ | G06F 17/30377 |
| | | | | 707/703 |
| 2015/0039478 A1* | 2/2015 | Heumann | ............... | G06Q 40/12 |
| | | | | 705/30 |
| 2015/0040033 A1* | 2/2015 | Kurtz | ................. | G06Q 10/107 |
| | | | | 715/752 |
| 2015/0156265 A1* | 6/2015 | Miller | ................ | H04L 67/1097 |
| | | | | 709/204 |

OTHER PUBLICATIONS

Oracle Corporation, "Distributed Transactions Concepts", https://docs.oracle.com/cd/A87860_01/doc/server.817/a76960/ds_txns.htm, Dec. 1, 1999.

Jeffrey A. Hoffer et al., "Modern Database Management. 7th Edition—Chapter 13", wps.prenhall.com/wps/media/objects/3310/3390076/hoffer_ch13.pdf, Jan. 1, 2005, pp. 13-30.

Office Action for corresponding European Application No. 16171927.3 dated Jul. 16, 2018.

Extended European Search Report issued by the European Patent Office dated Dec. 5, 2016 for corresponding Application No. EP 16171927.3.

IBM WebSpere Administration Guide for Federated Systems Version 9, XP55058352, Jan. 1, 2006, pp. 1-362, URL:ftp://ftp.software.ibm.com/ps/products/db2/info/vr9/pdf/letter/en_US/iiyfpe90.pdf.

* cited by examiner

| ▼ Partner Details | ✏ Edit |
|---|---|

| | |
|---:|:---|
| Partner ID: | 273097 |
| Name 1: | IDS - Scheer Sistemas de |
| Name 2: | Processamento de Dados Ltda. |
| Name 3: | |
| Name 4: | |

Additional Data

| | |
|---:|:---|
| Partner Status: | Active |
| PRM ID: | 15511 |
| CRM ID: | 166826 |
| Corporate Group: | 0000 |
| SAP Region: | Latin America/Brazil - no sub region |
| Territory: | |

▼ Interaction History

| Transaction Type | Description | Satus |
|---|---|---|
| Interaction Object | Mail form for partne... | Completed |
| Interaction Object | Reference Activity... | Completed |
| Interaction Object | Customer Referenc... | Completed |
| Interaction Object | Customer Referenc... | Completed |
| Interaction Object | Reference Activity... | Completed |

702

DATABASE INTEGRATION SYSTEM

FIELD OF THE INVENTION

The invention relates to the integration of database systems

BACKGROUND AND RELATED ART

Database systems may include a database and one or more applications which can query or perform transactions on the database. Often different databases may be integrated so that data updated or entered into one database system can be used in a different database system. This may be done using so called middleware. Middleware is software that communicates with the one or more applications and synchronizes the multiple databases via the one or more applications.

United States patent application publication U.S. 2015/0244567 A1 discloses various embodiments of systems and methods for unified configuration for cloud integration are described herein. In an aspect, the method includes rendering a unified configuration interface within a cloud application for performing cloud integration. The unified configuration interface includes a first widget to configure an external system for integration with the cloud application and a second widget to configure an integration flow (iflow) between the external system and the cloud application. The iflow defines data flow between the configured external system and the cloud application. Subsequent to receiving a confirmation of the selected iflow, integrating the external system with the cloud application to share data in the cloud.

SUMMARY

The invention provides for a method and a database integration system in the independent claims, Embodiments are given in the dependent claims.

The invention may relate to a database integration system for integrating diverse types of databases. The integration occurs at the data layer. In other words the integration of the databases is performed via the databases themselves. When an application on a first computing system sends a first root transaction to a local database of the first computing system, the database sends a first link transaction to a database integration system via a network connection. In some examples, the first link transaction may be considered to be a summary or metadata descriptive of actions performed on the local database of the first computing system that were caused by executing the first root transaction.

The database integration system then uses a mapping to generate a first routed transaction from the first link transaction for all of the other databases that are integrated by the database integration system. A potential advantage of such a system is that it greatly simplifies the synchronizing of multiple databases. There is no need to write middleware applications for synchronizing the various applications that might be used in the application layer. Also, once the synchronization is achieved at the data layer the synchronization is independent of what applications are used to perform transactions on the databases. One can change the application and the integration of the databases is still valid.

In one aspect the invention provides for a method of using a database assembly. The database assembly comprises at least three computing systems. Each of the at least three computing systems comprises at least one application and a local database system. An alternative wording is that each of the three computing systems implements at least one application and a local database system.

The database assembly further comprises a database integration system. The database assembly further comprises a network connection between each of the at least three computing systems and the database integration system.

The method comprises receiving a first root transaction by the local database of a first computing system. The first computing system is one of the at least three computing systems. The first root transaction is a database transaction generated by the at least one application of the first computing system. In this step the at least one application of the first computing system executes a database transaction which is referred to as the first root transaction. Next the method further comprises executing the first root transaction on the local database of the first computing system. The database transaction may for instance cause a change or modification of data stored within the local database of the first computing system. The method further comprises generating a first link transaction by the local database of the first computing system. The first link transaction is descriptive of the root transaction. In some cases the first link transaction may simply be a copy of the first root transaction. In other examples the first link transaction may be the first root transaction transformed into a standard data format. For example the first link transaction may be descriptive of actual changes or operations performed on the local database of the first computing system.

The method further comprises sending the first link transaction from the first computing system to the database integration system via the network connection of the first computing system. The method further comprises generating a first root transaction for at least one of the first remaining computing systems. The first remaining computing systems are the at least three computing system excluding the first computing system. The first routed transaction is generated using a first data mapping of the first link transaction to the local database of each of the remaining computing systems. In some instances if the first data mapping does not show that the first link transaction is mapped onto a particular computing system then the generation of the first routed transaction for that particular computing system may be skipped. The method further comprises sending the first routed transaction to the at least one of the remaining computing systems via the network connection. The method further comprises executing the first routed transaction on a local database of the at least one remaining computing system.

This embodiment may have the benefit that diverse database systems can be connected together with the need to code complicated middleware to enable the applications on the at least three computing systems to talk to each other. In this embodiment the integration is done at the database level. When a database makes a change it sends the first link transaction to the database integration system. The database integration system then generates a routed transaction for each of the first remaining computing systems that are relevant. For example if the first routed transaction contains data which is not mapped onto a field or other property in the database of the first remaining computing system then it is not necessary to send it a routed transaction.

In another embodiment, the database integration system comprises at least one update queue for holding routed transactions before sending routed transactions to the at least three computing systems. The routed transactions comprise the first routed transactions for each of the first remaining computing systems. The use of the queues may be beneficial because it may provide for a means of updating different database systems even when these database systems may be temporarily down or offline. The use of an update queue may also be beneficial because the routed transactions can be placed in a particular order. Systems that are more time critical may therefore be given priority.

In one example, there is only one update queue. In other examples there may be multiple update queues or even an update queue for each of the at least three computing systems.

In another embodiment, each of the at least three computing systems has a priority rating. The method further comprises ordering the at least one update queue according to the priority rating. This embodiment may be beneficial because it may enable the routed transactions to the systems which are more time critical. The priority rating could for example be assigned related to the particular system name, the particular user using the application, roles, profiles, and a timestamp difference etc, can be used for the criteria.

The use of the queues for example may enable the database integration system to be used with a real time transaction processing system.

In another embodiment, the generating of the first link transaction comprises generating a final timestamp for the link transaction. The method further comprises receiving a second root transaction by the local database of a second computing system. The second computing system is one of the remaining computing systems. The second transaction is a database transaction generated by the at least one application of the second computing system. The method further comprises executing the second root transaction on the local database of the second computing system. The method further comprises generating a second link transaction by the local database of the second computing system. The second link transaction is descriptive of the second root transaction.

Generating the second link transaction comprises generating a second timestamp for the second link transaction. The method further comprises sending the second link transaction from the second computing system to the database integration system via the network connection. The network connection is for the first computing system. The method further comprises generating a second routed transaction for at least one of the second remaining computing system. The second remaining computing systems are the at least three computing systems excluding the second computing system. The routed transaction is generated using a second data mapping of the second link transaction to the local database of the at least one of the second remaining computing systems. The routed transactions comprise the first routed transaction for the at least one of the first remaining computing systems.

The method further comprises adding the second routed transaction to the at least one update for sending the second routed transaction to each of the second remaining computing systems via the network connection. The method further comprises ordering the first routed transactions and the second routed transactions in the at least one update queue using the first timestamp and the second timestamp.

In this embodiment, two different computing systems have a root transaction that is generated. This claim relates to one way of resolving this without the use of database locking. In the database systems the databases may not contain entirely equivalent data or even database forms. It would therefore be impractical to implement some sort of database locking system. This embodiment solves this problem by having a timestamp affixed to each of the root transactions. The routed transactions which are then generated from this are then sorted in the queue according to the timestamp.

In another embodiment, the method further comprises deleting one of the first routed transaction and the second routed transaction from the at least one update queue according to at least one predetermined rule if the first timestamp and the second timestamp occur within a predetermined time. This embodiment solves another difficulty when there is no way of database locking the local databases in the at least three computing systems. If there is a large time period between two routed transactions then it may be assumed that they can simply be ordered in the queue.

However, if the users enter data into the database and it occurs within a short time period, such as a few minutes or maybe even an hour, then it may be necessary to look at the routed transactions to see if one or more of them should be deleted. One criterion can be to examine if the data fields are equivalent. If there is no conflict then they can simply be ordered within the update queue. If there is however fields which are equivalent then it must be decided which of the routed transactions should be kept in the queue and which should be deleted. This could for example be done using various properties such as giving certain systems priority, giving certain users priority, examining the read and write permissions of a particular user, or developing other criteria. This embodiment may be beneficial because it may provide for a means of synchronizing the databases automatically without the use of database locking.

In another embodiment, the method further comprises sending a queue deletion method from the database integration system to the computing system that generated the deleted routed transaction. This embodiment may be beneficial because it may lead to a situation where data has been updated in a particular local database and it is expected that this will be propagated. However, when a routed transaction is deleted from the at least one update queue this is not the case. Sending a message to the original system may be beneficial because it may enable the originating computing system to claw back and undo the changes to the local database.

In another embodiment, each of the routed transactions within the at least one update queue has a target system selected from the at least three computing systems. The method further comprises keeping a failed transaction in an update buffer if sending to the target system fails. The method further comprises poling the target system if sending to the target system fails and resending the failed transaction when poling of the target system is successful. This embodiment may be beneficial because it may provide for a means of updating a local database and a target system if the target system is unavailable, such as if it is not instantiated or it is offline. The typical method of using middleware often relies on the systems being available all the time. This embodiment provides for a means of updating even when systems are completely unavailable.

In another embodiment, the target system is an on-demand computing system. An on-demand computing system is a system which is instantiated or loaded into a virtual system only when it is needed. The method further comprises keeping the failed transaction in an on-demand system buffer until the on-demand computing system is instantiated or booted up. This may be beneficial because if there are large numbers of updates that are being sent to the on-demand computing system it may be expensive and inefficient to constantly have to bring the on-demand computing system on in order to apply the updates. In this embodiment, the failed transactions are simply kept in a buffer and once the on-demand system is instantiated then the target database of the on-demand system can receive the routed transactions. In one example the on-demand system may boot and then this is detected via the poling. This then causes the failed transactions to be sent to the on-demand computing system and the local database can be updated before the user uses it.

In another embodiment, the on-demand computing system is instantiated as a virtual machine by an on-demand system. The on-demand computing system is instantiated by a request from a user interface to the on-demand system.

In another embodiment, each of the routed transactions within the at least one update queue has an originating system selected from the at least three computing systems. The method further comprises notifying the originating system when successful transactions are accepted by the target system. This may be beneficial because the first computing system may wait on applying updates to its own local database until it is certain that these updates have been propagated throughout the system. In some examples after a certain period the routed transactions may expire or fail. The database integration system could then use journaling to claw back changes to the other systems if necessary in such a case.

In another embodiment, the method further comprises deleting a routed transaction from the update queue if a predetermined criterion is fulfilled. The method further comprises notifying the computing system from which the routed transaction originated from if the routed transaction is deleted.

In another embodiment, the method further comprises generating the application command in response to the first link transaction by the database integration system. The application command is generated using a set of predetermined criteria. The method further comprises sending the application command to a selected computing system via the network connection. The selected computing system is selected from the first remaining computing systems. The method further comprises executing the application command by the at least one application of the selected computing system. This embodiment may be beneficial because actions on the local database of the first computing system may be used to trigger actions on the other databases. In this embodiment in addition to being able to send messages to the local databases, the database integration system can explicitly be able to send commands or instructions to the at least one application on the other computing systems.

In another embodiment, the method further comprises sending a successful execution method to the first computing system if the execution of the first routed transaction at a local database of at least one of the remaining computing systems is successful. This embodiment may be beneficial because it may be used to synchronize actions between the different computing systems. For example one system may be used to order materials and another computing system may be used for generating invoices or billing. When a request for materials is entered into the first system the order may be held back from being processed until the invoice is successfully generated by another system.

In another embodiment, the method further comprises generating the first routed transaction for a selected system of the first remaining computing systems only if the first data mapping indicates that the first routed transaction is relevant for the selected system. Being relevant may for instance mean that the first root transaction contains data which may be translated into a field on the local database of one of the first remaining computing systems. If the data entered in the first root transaction would not be translated into changes in the database of a particular computing system then there is no need to generate a routed transaction for it for that particular computing system.

In another embodiment, the first routed transaction comprises a database tunnel routing between the local database of the first computing system and the local database of the at least one remaining computing system. Executing the first routed transaction on the local database comprises establishing a database tunnel between the local database of the first computing system and a local database of the at least one remaining computing system. This database tunnel is for example established by the database integration system for synchronizing the local database of the at least one remaining computing system with the local database of the first computing system and the database tunnel may remain until the synchronization is complete. The method further comprises synchronizing the local database of the at least one remaining computing system with the local database of the first computing system via the database tunnel. This may be beneficial because in this embodiment the database integration system acts as a mediator for establishing the database tunnel. This may be more efficient than copying all of the data to the database integration system and then sending it as commands to the local database of the at least one remaining computing system.

In another aspect, the invention provides for a database integration system. The database integration system comprises a network connection to each of the at least three computing systems. Each of the at least three computing systems comprises at least one application and a local database system. The database integration system further comprises a memory for storing machine-executable instructions. The database integration system further comprises a processor. Execution of the machine-executable instructions causes the processor to receive a first link transaction descriptive of a root transaction from a first computing system. The first computing system is one of the at least three computing systems.

Execution of the machine-executable instructions further causes the processor to generate a first routed transaction for at least one of the first remaining computing systems. The first remaining computing systems are the at least three computing systems excluding the first computing system. The first routed transaction is generated using a first data mapping of the first link transaction to the local database of the at least one of the first remaining computing systems. Execution of the machine-executable instructions further cause the processor to send the first routed transaction to the at least one of the remaining computing systems via the network connection.

In another embodiment, the memory contains a data mapping library. Execution of the machine-executable instructions further cause the processor to search the data mapping library for the first data mapping in response to receiving the first link transaction. When the first link transaction is received the processor may search the data mapping library to see if the particular data within the first link transaction has an existing mapping to the first remaining systems. If it does then it will retrieve them and this will be used.

The data mapping library may be constructed using different criteria. Factors which may be considered may include:

1. Requirement Category→Integration or Data Transfer
2. In Which network zone the Source and target systems are located
3. which Database is used by the Source and target systems
4. Data structure and Data format of Source and Target systems
5. Technical contact from Source and Target systems. This may include such factors as mapping Details between source and target tables. This could be, for example, accomplished by using field level specific transformation details between source and target table fields.
6. Certificate Details such as Certificate Format and Certificate Validity Decision Criteria: The below points related to message and data transfer may be considered when the integration is planned:

Interval—what intervals are the messages/data being sent, e.g. irregular or transfer at a specific time of the day/day in a week/day in a month Volume—Volume of messages/Records—low (<100/day), medium (between 100 and 5000/day), high (higher than 5000/day), Will the scenario be used for mass replication/initial loads?

Communication type—Synchronous or asynchronous message transfer

Size—Approx. message size in kB or MB—small (<200 kB), medium (between 100 kb and 5 MB), large (>5 MB)

Message Throughput—What is the expected message throughput? How long can the message processing take until it gets business critical?

In another embodiment, execution of the machine-executable instructions further cause the processor to generate the first data mapping using a data mapping algorithm if a first data mapping is not found in the data mapping library. In this embodiment if the data mapping is not found then the system uses a data mapping algorithm to generate this explicitly.

In another embodiment, the data mapping algorithm incorporates any one of the following: intelligent mapping, machine learning, Natural Language Processing, Deep Learning, Graph Theory, Deep Linguistic processing, Neural Networks, Natural Language Understanding (NLU), Machine Translation (MT), and combinations thereof. The mapping for instance may be done using meta data which is descriptive of all of the local databases. For example the meta data may contain information about the various types of tables and formats and a translation between them. The mapping may also be done by comparing source target and target data types in the different local databases. The mapping may also be done by looking at the data transfer volume and whether the updating is done synchronously or asynchronously.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, DVD-R disks, or Blu Ray disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage may be any volatile or non-volatile computer-readable storage medium.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention.

Computer executable code for carrying out operations for aspects of the present invention may be written in any combination of one or more programming languages, including an object oriented programming language such as Java, Smalltalk, C++ or the like and conventional procedural programming languages, such as the C programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

In the following embodiments of the invention are explained in greater detail, by way of example only, making reference to the drawings in which:

FIG. 7 shows an example of a database object 700 or data which may be placed into a database.

DETAILED DESCRIPTION

Like numbered elements in these figures are either equivalent elements or perform the same function. Elements which have been discussed previously will not necessarily be discussed in later figures if the function is equivalent.

Figure 1:
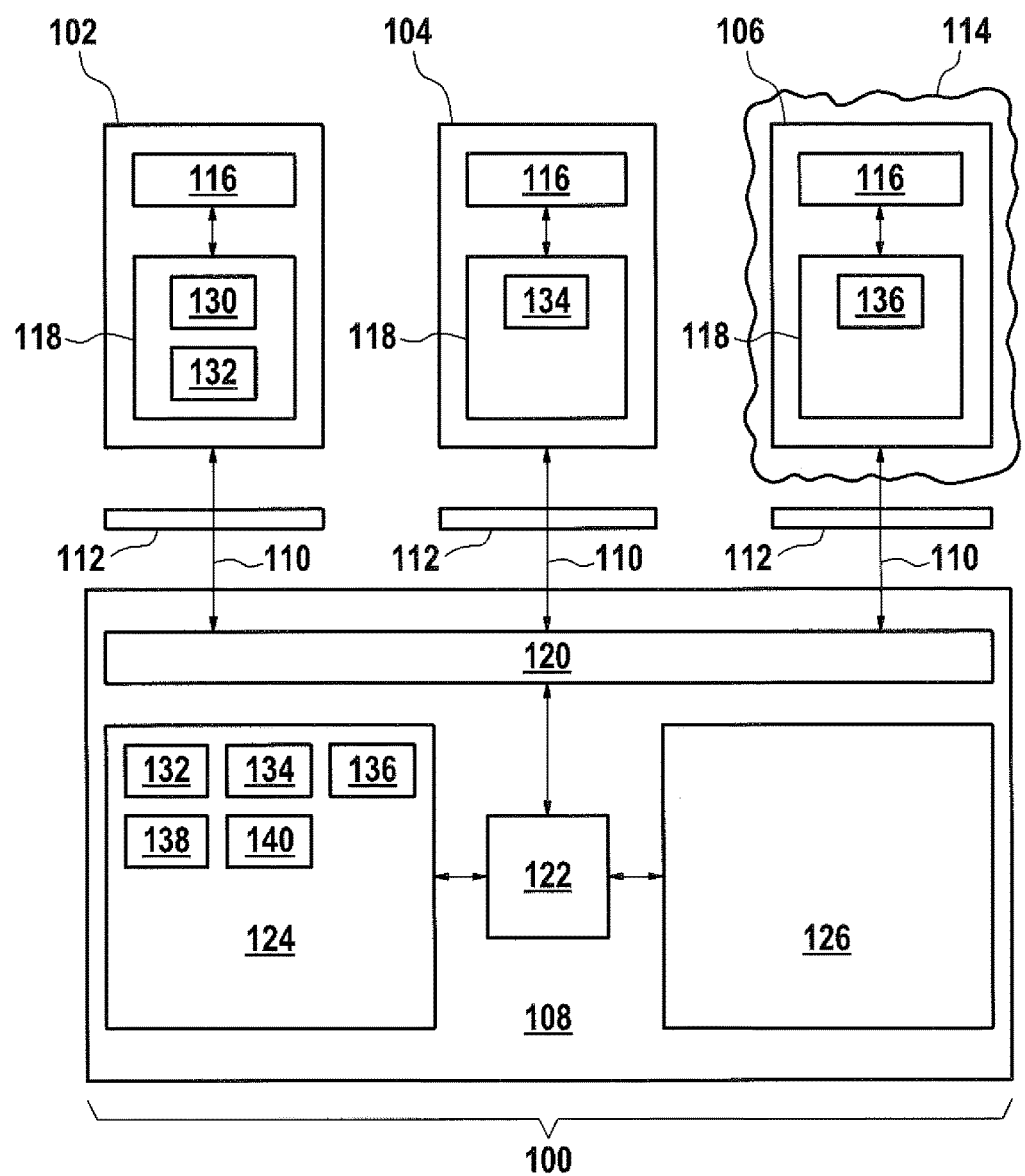
FIG. 1 illustrates an example of a database assembly.

FIG. 1 illustrates an example of the database assembly 100. The database assembly comprises a first computing system 102, a second computing system 104, and a third computing system 106. These computing systems 102, 104 and 106 are exemplary. The database assembly 100 may comprise more computing systems. The database assembly further comprises a database integration system 108. The database integration system 108 may for example be a computer. The database assembly 100 is also shown as containing a number of network connections 110 that go between each of the computing systems 102, 104, 106 and the database integration system 108. Each of the network connections 110 is shown as having an optional firewall 112. Any of the computing systems 102, 104, 106 and also the database integration system 108 may be implemented as on-demand systems.

The third computing system 106 is shown as being implemented as an instance on an on-demand system 114. The on-demand system 114 may for instance provide blade or other servers upon which a virtual machine used to make an instance of the third computing system 106 may be done. Each of the computing systems 102, 104, 106 comprises at least one application 116 and an implementation of a local database 118. The local database 118 and the at least one application 116 may be different on each of the computing systems 102, 104, 106. The database integration system comprises a network interface 120 that is connected to each of the network connections 110. The database integration system 108 further comprises a processor 122. The processor 122 is also in connection with a memory 124 and an update queue 126. The update queue 126 is also exemplary. In this example there is only one update queue 126 shown.

However, in other examples there may be more than one update queue. For example there may be an update queue for each of the computing systems 102, 104 and 106. The local database 118 of a first computing system 102 is shown as having received a first root transaction 130 from the at least one application 116 of the first computing system 102. In response to receiving the first root transaction 130 the local database 118 creates the first link transaction 132. The first computing system 102 then sends the first link transaction 132 to the memory 124 via the network connection 110. The memory 124 is shown as having a first routed transaction 134 for the second computing system 104 and a first routed transaction 136 for the third computing system 106. The first routed transactions 134, 136 were created using a first data mapping 138. The first data mapping 138 contains a mapping of the first link transaction 132 into transactions 134 and 136.

The memory 124 is further shown as containing machine-executable instructions 140. These enable the processor 122 to send and receive the messages and also to apply the first data mapping 138 to generate the first routed transactions 134, 136. In some instances the data and the first link transaction 132 may not be able to be mapped into the first routed transaction 134 and/or the first routed transaction 136. In this case some examples will simply not create a first routed transaction if it does not contain data which should be updated in a particular local database 118.

Figure 2:
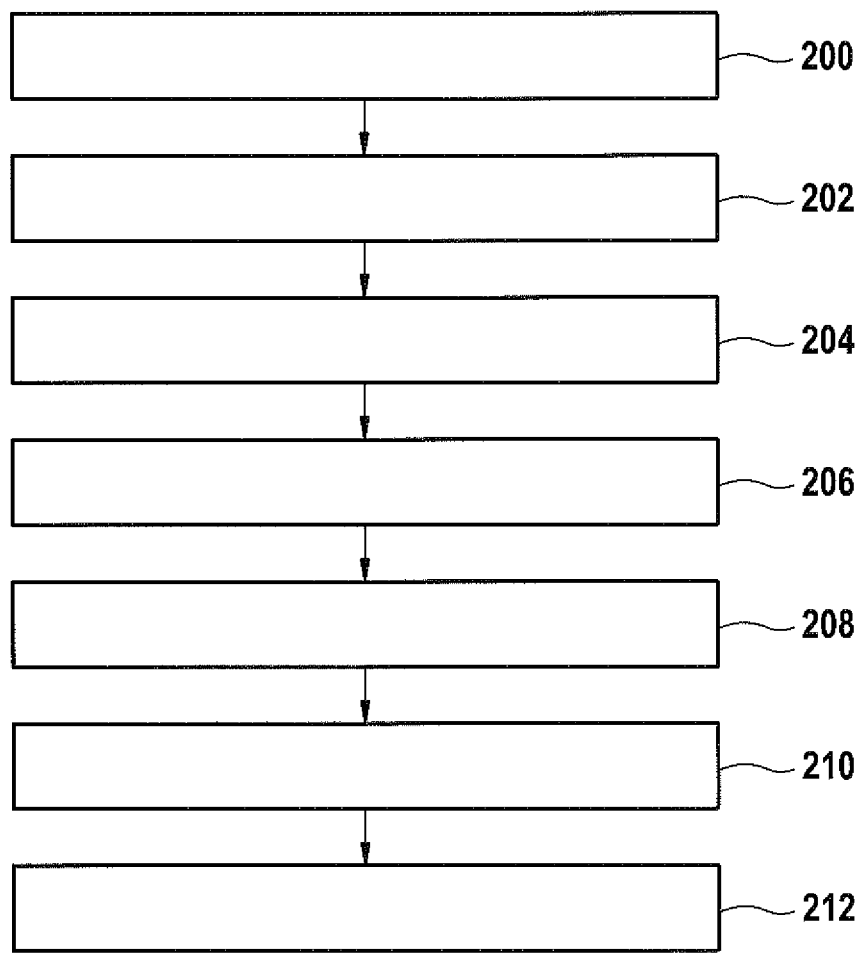
FIG. 2 shows a flow chart which illustrates a method of operating the database assembly of FIG. 1.

FIG. 2 shows a flowchart which illustrates a method of operating the database assembly 100 of FIG. 1. First in step 200 the method comprises receiving the first root transaction 130 by the local database 118 of the first computing system 102. The first root transaction 130 is a database transaction generated by the at least one application 116 of the first computing system 102. Next in step 202 the method comprises executing the first root transaction 130 on the local database 118 of the first computing system 102. Next in step 204 the local database 118 of the first computing system 102 generates the first link transaction 132. The first link transaction 132 is descriptive of the root transaction 130. For example the database may convert the first root transaction 130 into the first link transaction 132 by using a standard format. Next in step 206 the method comprises sending the first link transaction 132 from the first computing system 102 to the database integration system 108 via the network connection 110.

Next in step 208 the method comprises generating a first routed transaction 134 and 136 for at least one of the first remaining computing systems. The first remaining computing systems are the at least three computing systems excluding the first computing system 102. In this particular example the first remaining computing systems are computing systems 104 and 106. The first routed transaction 134 and 136 is generated using the first data mapping 138. The method further comprises sending the first routed transaction 134, 136 to the at least one remaining computing systems 104, 106 via their network connections 110. Finally in step 212 the method comprises executing the first routed transactions 134 and 136 on the local databases 118 of the at least one remaining computing systems 104, 106. In this example the update queue 126 was not used. In some examples the first routed transaction 134 and 136 would first be loaded into the update queue 126.

Figure 3:
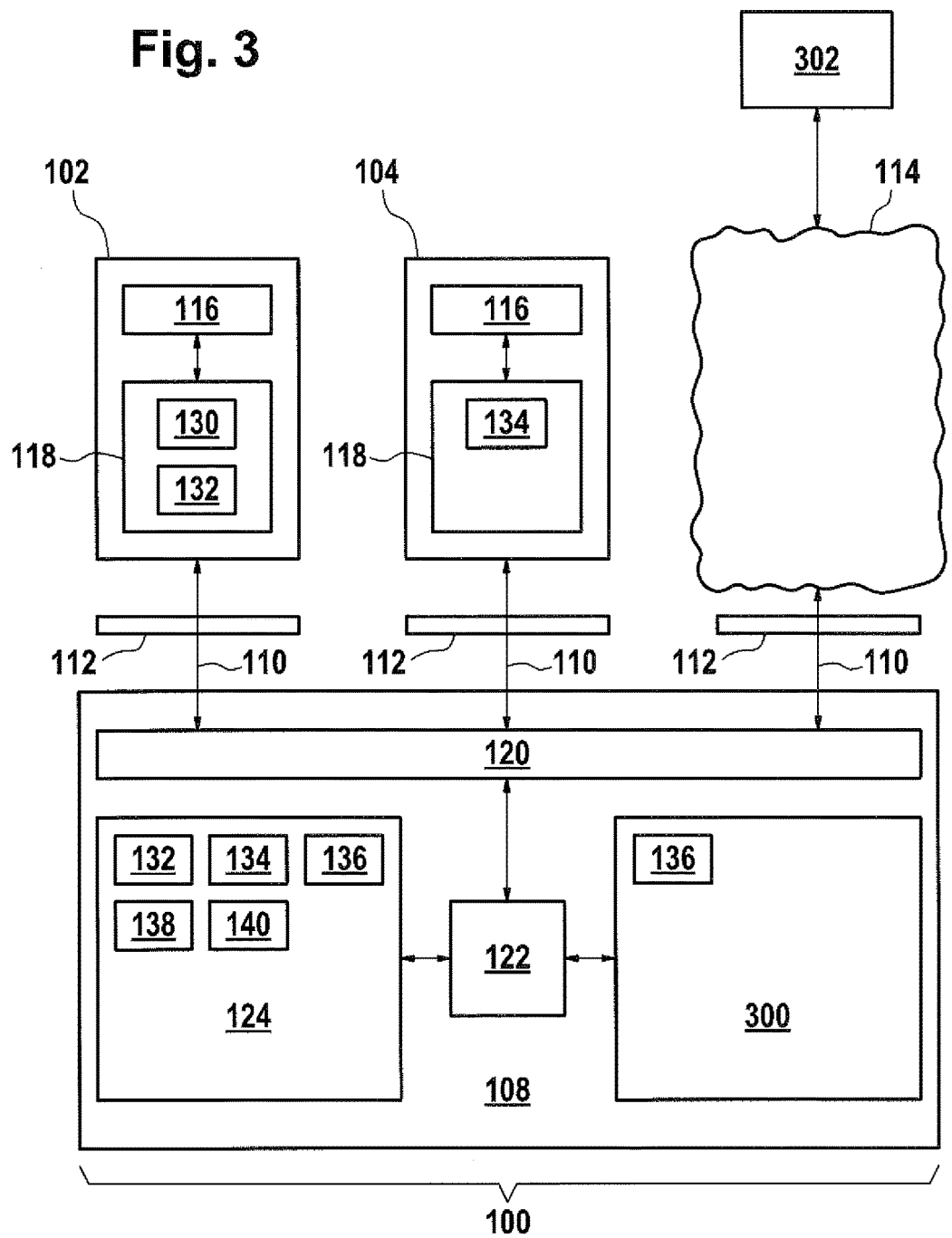
FIG. 3 shows a further example of a database assembly.

FIG. 3 illustrates the database assembly 100 in a situation where the third computing system 106 is not available. The third computing system 106 is implemented in an on-demand system 114. The third computing system 106 may not be loaded into a virtual machine and may not be available. In this example the database integration system 108 is shown as containing a buffer 300 for storing failed messages. Because the third computing system 106 was not available the routed transaction 136 for the third computing system was placed into the buffer 300. The database assembly 100 is also shown as being connected to a user interface 302 of a service which can request the use of the third computing system (not shown in this figure). The processor 122 may use the network interface 120 to poll the on-demand system 114 to see if the third computing system 106 comes online. Alternatively the on-demand system 114 may also send a message to the processor 122 to inform it that the third computing system is available when it is loaded.

Figure 4:
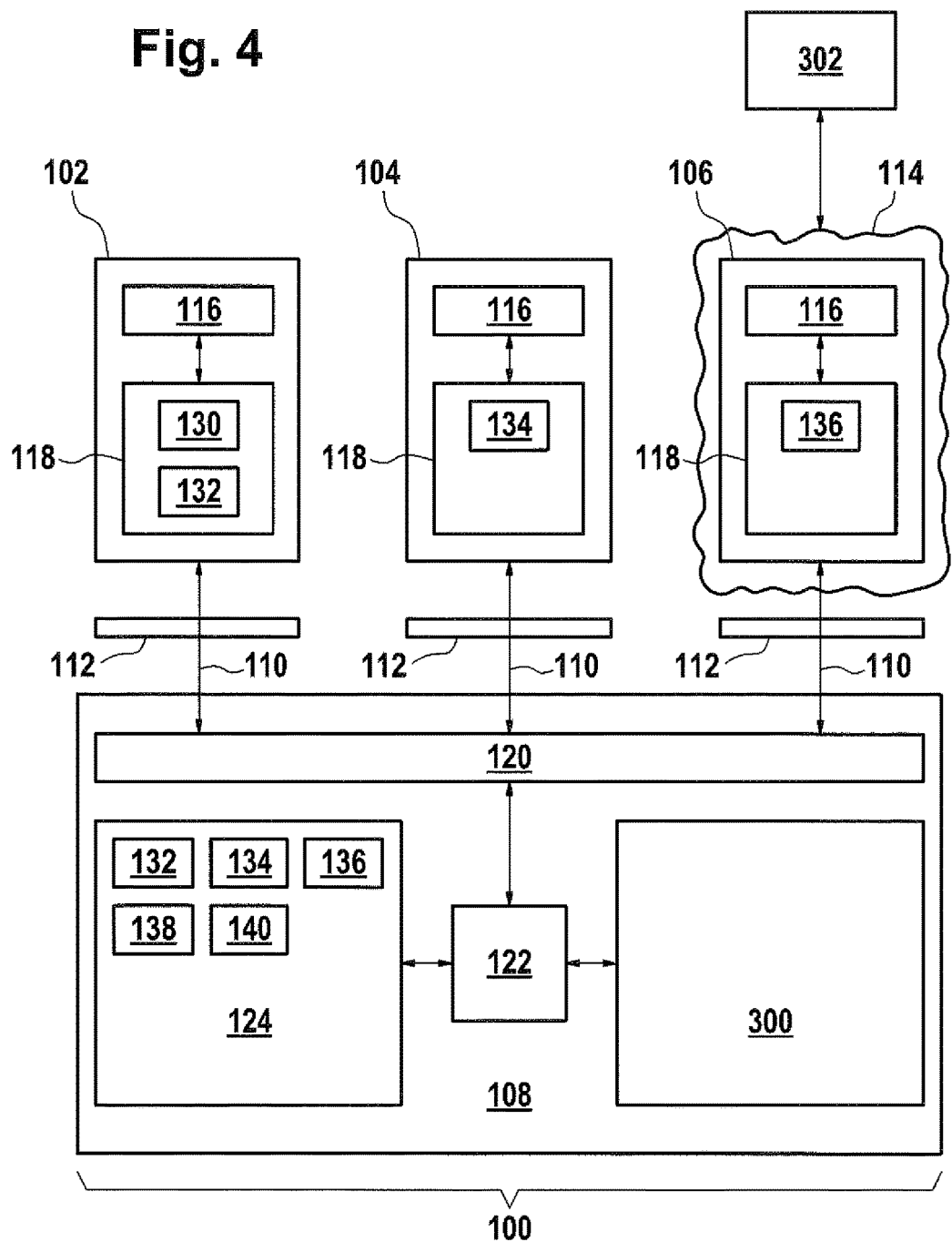
FIG. 4 shows a further example of a database assembly.

FIG. 4 shows the database assembly 100 after the user interface 302 has requested use of the third computing system 106. The on-demand system 114 has called an instance of the third computing system 106 into existence in response to this request. After the third computing system 106 was instantiated the first routed transaction 136 was transferred from the buffer 300 to the local database 118 of the third computing system 106.

Figure 5:
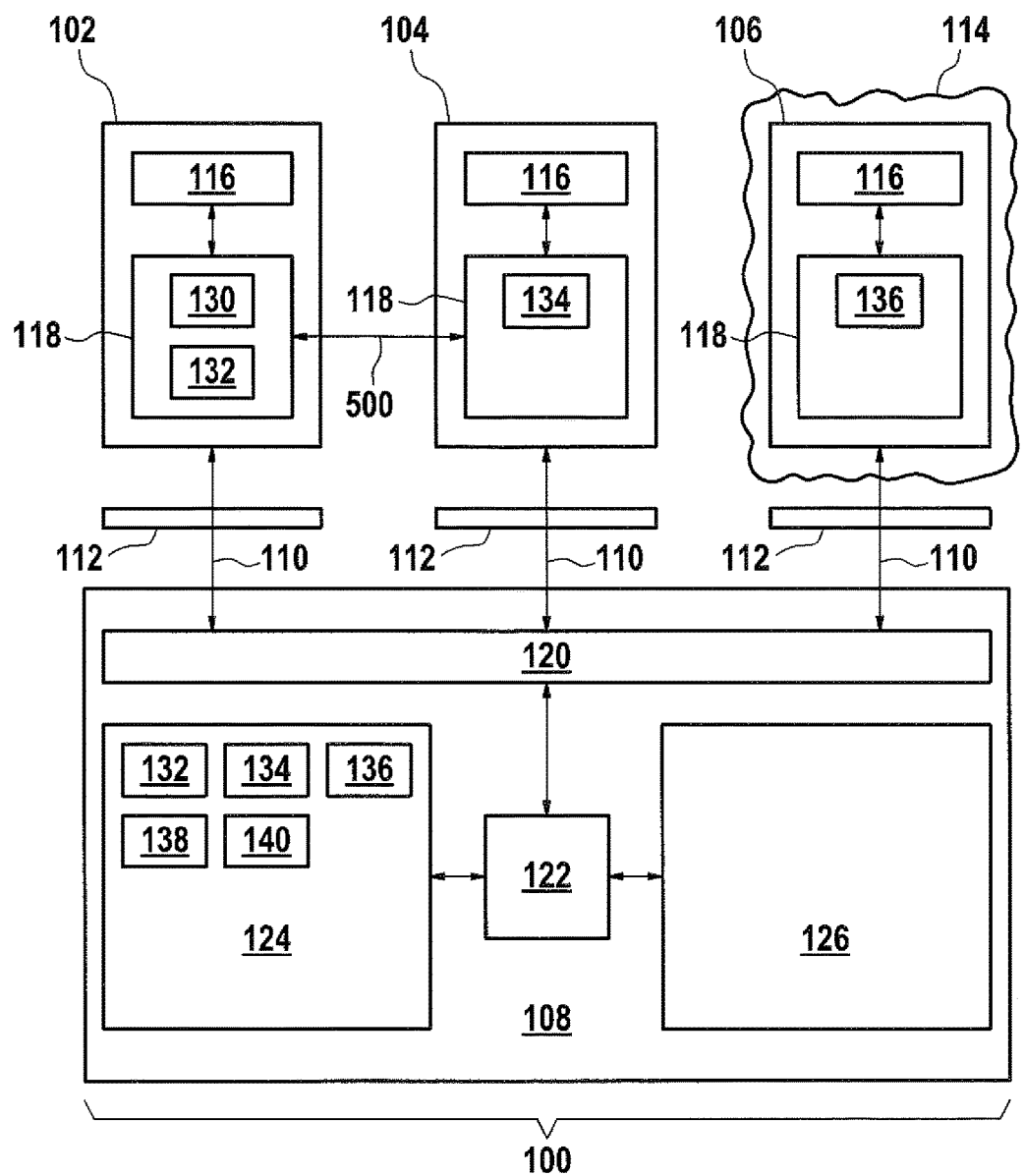
FIG. 5 shows a further example of a database assembly.

FIG. 5 shows a further example of the database assembly 100. In this example the first routed transaction for the second computing system 134 is used to mediate a database pipe 500 between the local database 118 of the first computing system 102 and the local database 118 of the second computing system 104. In this instance the pipe 500 may be used to update the local database 118 of the second computing system 104 directly from the local database 118 of the first computing system 102. This may be more efficient than transferring data through the database integration system 108.

Real world database use typically require integration between various systems both inside and outside an database assembly. The real world database processes may span across multiple systems over an onpremise (OP) and ondemand (OD) systems in a heterogeneous network. Since the database processes spans across multiple systems there is a need for Data Replication & Integration between Multiple systems (both onpremise and ondemand) over the network. Integration across the boundaries of on premise and on demand systems is may be beneficial to prevent Applications silos.

Nowadays cloud solutions provide lots of functions covering a wide range of database processes, Based on different database processes, the cloud solutions are designed as open solutions offering various integration points. This OD/OP integration leads to transactional and bidirectional replication of database objects or a subset of it.

The complex Database processes leads to complex integration between multiple systems most of them are actually point to point which makes the maintenance extremely complex. The data replication is uncontrollable and leads to many data quality issues in the multiple systems in the Database assembly network. This also leads to slower software deployments and increase the time for Mergers & Acquisitions. The system landscape is not scalable, flexible for new systems integration & increases TCO.

There are multiple long running database processes in an Database assembly with involvement of several people or teams within the organization, so there is a need for separation of the tasks between the different systems. There are Scenario's where the on premise system is deployed in the Headquarters of a Company and the OnDemand systems are deployed in the Subsidiaries and the same data is processed by different users in the onDemand & onPremise system and hence there is a need for Data Quality, Data consistency between different systems.

The above scenario led to create/edit the same Database Transaction documents by users in different onpremise and ondemand systems in the Database assembly network since people or teams are only responsible for parts of these activities. Some users are using ondemand systems and some are using onpremise systems in real time scenario. There is a need for Data consistency for the Database Documents even though they are created/edited from different systems. All kind of changes on one side should be automatically synched to the other side in a bidirectional way. There can be conflicting situations when users are changing the related Documents at the same time.

This lead to different challenges when operating a database system, like below:

Complex Database assembly System Landscape
No unified Data Governance process
Increased TCO
Increased Timeframe for Merger & Acquisitions
Slower and costly Deployments
Non Managed Data Replication
Increasing on Demand & on Premise systems every year in the Landscape
Stability issues due to uncontrolled historical growth
Current landscape not scalable for database demand
High Data Footprint and Redundancy
Incomplete or siloed Data Governance
Database Processes disruptions due to Data discrepancies between on premise and Cloud systems Examples may provide for a system which we can avoid this Data inconsistency and provide Data Integration and Governance to other systems in the Database assembly landscape and maintain the needed Data Quality & Data Integrity.

An example may be a Data Platform that is based on loose coupling, Metadata driven design, Event driven approach and Publish-Subscribe Architecture. It provides Agile Data Provisioning by supporting Relational, Hierarchical, Flat Files, Big Data sources (Hive), Log based, semi-structured, and unstructured formats with all provisioning styles (batch, real-time, federation, event-based). It can understand and provide different Data Formats (IDocs, XML, OData, JSON, Flat Files, SOAP etc.). It is scalable and flexible for integrating new SAP & non SAP systems (on Premise, on Demand), Databases also. It provides Data Governance with End to End Data Management services along End to End Monitoring, Support, Triggering, Tracking and Logging capabilities.

All the different systems (onDemand and onPremise) may be loosely coupled by using asynchronous communication. We rely on the fact that the systems are highly available and always connected in the network. We do not expect to have situations where the applications are offline for a longer period of time. For any kind of asynchronous message based communication we expect a typical delay of very few (2-3) seconds.

The architecture may have message conversion supports application to application integration, database network integration by a message orchestration hub. In the below approach, system of record for the Data can be on premise or on Demand. It may allow XML based message transformation and it is Fast (nearly real-time). It allows Bi-Directional communication and it is possible even across security zones and firewalls.

The onDemand systems may be kept in the Internet zone and the onPremise systems are kept behind the Firewall in a secure zone so that they are not accessible over the Internet. The communication between onDemand systems and onPremise systems happens via a database integration system which may also be referred to as a Toggle Framework. The Toggle Framework interacts with the onDemand systems and with the onPremise systems in the Application layer or in the Data layer (based on customization settings). The Data can be created and edited in onDemand and onPremise systems and hence it is distributed in bidirectional direction via the Toggle Framework.

The Framework may check for Database object completeness before Replication. It takes care of Dependent Objects Replication also if needed. For example, when Opportunity Data has to be replicated, the relevant Objects like Employee details, Database Partner details, relevant Partner Function etc. related to that Opportunity has to be replicated for completeness and to avoid any error in the replicated system. The Framework allows for different configuration, mapping according to different Database processes. Options are provided to check dependencies between different Database objects and between different Attributes also. The customizing allows defaulting values and activating Mandatory checks if needed. Events can be triggered based on specific values and the order of event Triggering can also be customized based on the Database requirements.

When multiple users edit the same Database Transaction Document from different onDemand & onPremise systems the Timestamp for the edited Document is taken from the leading onPremise/onDemand system (Leading system for system of Record) and the Timestamp is checked during saving the transaction for the same Document. If the Timestamp is same means it indicates that the Document is not edited by any other users from other system. If the Timestamp is different means it indicates that the Document was edited in the meantime by other users from other system. In this case, the changes of the user and the system name are stored in the Temporary storage (Asynchronous Queue) and synchronized when the current operation on that specific Database document is completed. This may ensures that the data is not lost and the specific changes are merged with the Database document when the current lock was released. The changes are tracked using a "Change History" option where the changes from different systems, different users are tracked for every Database Document. If the Data from the onDemand system is rejected means this will be send as a Data feed to the user in the onDemand system.

This approach helps in creating follow-up Documents from different Applications (ex: CRM, concur) using same or different database using voice and from Mobile devices.

For example, based on the Service Request for a Customer Implementation in a CRM system (onPremise), you create a follow-up travel Request document in the concur system (onDemand) for the Customer Visit.

When the Application User creates a Database Document and when he creates any further Documents with respect to the initial parent document (either in the same system or in other system) the Interaction Object is automatically created to track the further Documents which are created as a reference to the Parent Document. The Interaction Object can be customized to be created in the same system (like the parent document) or in the other system (in order to track the subsequence documents). The Database objects, Interaction Object, the Follow-up documents are in the same system or in the different system based on the customization settings.

The Interaction objects can be linked with different Database objects like Accounts, Contacts, Leads, Opportunity, Sales Order etc. Options are provided to activate Interaction objects for specific Database objects. Options are provided to create follow-up Documents from a specific Interaction objects also.

There are different details displayed when the Interaction Objects are linked with different Database objects. Options are provided to have specific attributes based on the linked Database object with the Interaction Object.

This approach works even when the Framework is distributed between multiple systems in an Database assembly network. The Interaction Object can be used with Database Transaction from same or different systems (multiple systems) across a heterogeneous network. This helps to see the Predecessor and the Successor documents created from different Applications for the specific Database Document.

Technically the Transaction context is maintained between multiple applications by a Root Transaction, Link Transaction & Routed Transaction. The above are needed for maintaining a valid transaction context including session variables, Transaction Token to track the order of query execution between different Applications in a logical user session.

The Root transaction is initiated by the User (the current transaction context) which triggers the Link Transaction based on the Request Type which is the first physical connection of a logical session and the context is tracked using the Transaction Token, session variables, metadata and stored in a Temporary table. The order of query execution is tracked and stored Temporarily to have the whole transaction context to maintain the Transactional Integrity between multiple Applications running on a the same Database. Based on the events created in Link Transaction, different Routed Transactions are getting created to ensure the needed Transactional Integrity of the Database Document. The entire Transaction context is tracked via the Transaction Token.

There may be options provided in the Data Management Central Services layer for doing Duplicate check in the Database layer level for the given Accounts or Contacts in order to avoid Duplicates in Master Data level. The Rules are maintained in this Central layer for doing the Field-level Validation & Address Validation for the Database Documents creation.

Figure 6:
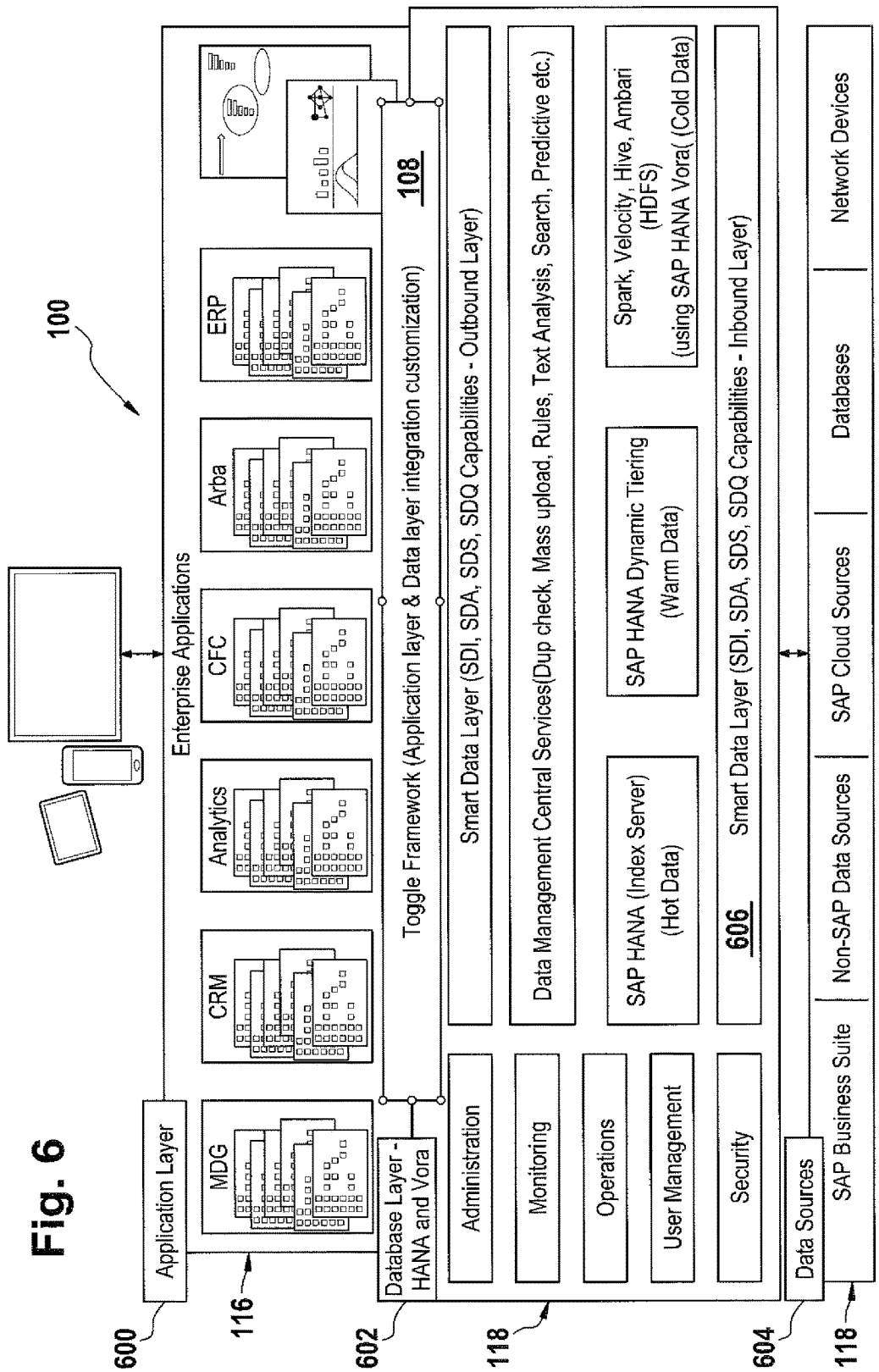
FIG. 6 shows a further example of a database assembly.

FIG. 6 shows a more detailed example of a database assembly 100. The figure in FIG. 6 shows the database assembly 100 from a functional point of view. It comprises an application layer 600, a database layer 602, and various data sources 604. The database integration system 108 is referred to as the toggle framework 108 in this figure. It can be seen that the toggle framework 108 integrates the system in the database layer 118. In this figure there is a smart data layer 606 which may be used as a data mapping algorithm for generating the first data mapping.

The Data which is created in different onPremise and on Demand systems are sent to the Data Governance system or the Data Platform.

The Data Governance system (Data Platform) maintains the Central Reference Database for all the different systems by considering the different rules for every Database object. When the governance system receives a Record from an onpremise or an ondemand system it validates the Data against the Central Reference Database and checks for Data completeness by applying the related rules for that particular database object.

The Data platform understands different Data Formats like IDocs, XML, OData, JSON, Flat Files, SOAP etc. and stores the data in a canonical format in the different tables in the database. When the Data is sent to the data platform from any data source systems like on premise or on demand system, the data is mapped from the Raw Model to the Canonical Model and stored in the canonical database. Based on the Subscriber data format, the data is converted in the Target data format which can be understood by the Subscriber system. The canonical format in an ideal representation of a data domain (like Account, contact etc.) and it is independent of the source and target structures of the different systems in the database assembly network.

It supports the mapping of fields in data level (in Data layer) and in CDS view level in the same or different databases (between tables in different schemas). In case of mapping of fields in Application level (Application Integration Flows) for different Application's (CRM, CFC) using same (using Multi Database Containers) or different databases is also supported through customization based on the Integration Definition.

The Integration in Data level in tables and Application level (process level) can be configured in the Toggle Framework. The Toggle Framework supports the Co-deployment of different Applications (like CRM, ERP) in same database using different schema options.

When the Documents are edited by the User which are converted to XML format and validated against the corresponding Backend Tables (Data layer logic)/Application Layer logic in the Database systems.

Data platform as a service handles integration in a cloud-based platform, and provides the capabilities at the application layer. Toggle Framework is a set of API's which take care of the Application level Integration and Data level Integration with customizing and configuring options mainly based on the Decision Criteria table. Decision Criteria: The below points can be considered when the integration is planned Message/Data Transfer
Interval: What intervals are the messages/records being sent, e.g. irregular or transfer at a specific time of the day/day in a week/day in a month
Volume: Volume of messages/Records—low (<100/day), medium (between 100 and 5000/day), high (higher than 5000/day) Will the scenario be used for mass replication/initial loads?
Communication: Synchronous or asynchronous message transfer
Size: Approx. message size in kB or MB—small (<200 kB), medium (between 100 kb and 5 MB), large (>5 MB)
Message Throughput: What is the expected message throughput?

The Toggle Framework uses the service channels for more session time & to achieve a highly available database connection. With service channels, it allows secure and reliable access from an external network to certain services on the Platform, which are not exposed for direct access from the Internet. The service channel takes care that the connection is always available and communication is secured. Once the database tunnel is established, you can connect on-premise database or BI tools to the selected HANA database in the cloud by using Host, port in the JDBC/ODBC connect strings. The on-premise DB tools can be connected via ODBC to the SAP HANA database for a limited session time.

Multitenant Database Containers (MDC) may have one or more of the below features:
Run multiple tenant databases on one database system (SID)
Run/support multiple applications/scenarios on one database system (SID)
Strong separation of data and users
Application specific life cycle management
Resource management—allocate memory and/or CPU per tenant DB
Easy move of tenants/applications to different hosts/systems
Cross-database queries between multitenant database containers The Data Governance system distributes the data to the interested systems in the Database assembly network. It ensures the appropriate data quality for each Database object by validating the data against specific set of rules before distribution. The Rule set are stored in different tables and it maintains a Central Rules Repository. When the Data is successfully distributed the logging in done in the Logging and Tracking Tables.

The onDemand systems may be kept in the Internet zone and the onPremise systems are kept behind the Firewall in a secure zone so that they are not accessible over the Internet. The Data can be created and edited in onDemand and onPremise systems and hence it is replicated in bidirectional direction via Data Governance system. The Monitoring capabilities are provided in the Governance system. There is full transparency of Data movement with end to end monitoring, tracking, triggering and support.

The Framework checks for Database object completeness before Distribution. It takes care of Dependent Objects Distribution also if needed. For example, when Opportunity Data has to be distributed, the relevant Objects like Employee details; Database Partner details, relevant Partner Function etc. related to that Opportunity has to be distributed for completeness and to avoid any error in the distributed system. The Framework allows for different configuration, mapping according to different Database processes. Options are provided to check dependencies between different Database objects and between different Attributes also. The customizing allows defaulting values and activating Mandatory checks if needed. Events can be triggered based on specific values and the order of event Triggering can also be customized based on the Database requirements.

The Data may undergoes one or more of the below stages to make into Reference Data Management (Canonical Database):
Data Cleansing
Standardization
Duplicate Check
Data Enrichment
Building Match groups
Best Record Calculation The Framework allows configuring leading system for every Database object and the rules applicable for every Database object. Options are provided to configure different rules based on different source systems also for the same Database object. The Data Platform may have one or more of the below components:
Central Data Governance Layer (Data Governance Framework)
Meta Data Management (Metadata Repository Management Framework)
Data Publisher and Distribution (Data Formatting Framework)
Active Data Management—Data Processing Framework
Canonical Layer—Reference Data Management
Persistency Layer—Data Storage Framework
Central Rules Management
Data Distribution Adapters—Data Distribution Framework
Format Identifier and Dispatcher (Data Dispatching Framework)

The Toggle Framework may have one or more of the following advantages:
Unification of architecture
Scalable Architecture for on Demand & on Premise systems for Seamless Integration
Streamline Data Governance Processes (Operational Excellence and Efficiency)
Improve Data Governance by deploying ONE Master Data Governance strategy
Managed Data replication between different systems in the Database assembly Landscape
Reduced Timeframe for Merger & Acquisitions
Deliver faster and cheaper Deployments
Platform Harmonization and Landscape Simplification
Leverage common Technical infrastructure
Reducing Point to Point Communication
Reducing Data Replication Time
Reduce system landscape Complexity and Easier to maintain
Maximize End User Adoption with unified Data Governance Process
Substantial System Landscape Simplification by eliminating Interfaces
Higher Flexibility & Scalability
Lower TCO and Low Risk
Avoiding unnecessary Data Replication, Data uploads
Provide an Unified Data Governance Process across the entire system landscape and ensure Data Quality
Unified Data Quality Reporting
Reduced Data Load across the entire system landscape
User Simplicity
New systems can be easily integrated in a limited timeframe for M & A and Shorten Time-to-Market
Speed time-to-insight and action by allowing database users to directly access, manage, and visually interact with Database data.
Single source of Truth
Real time Database process Integration
Data Integrity and Interoperability
Full transparency on Data Movements
Agile to the integration of new sources/targets systems
Technical Co-Deployment
Bypass Middleware Technology
Cross Application Reporting
Cross Application UI
Process Optimization
Master Data Unification
Higher Data Quality
Reduced Data Footprint
Simplified System landscape with less admin effort The database assembly may comprise a Data Integration and Governance Framework, which may have one or more of the following features:
Platform based on Loose coupling, Metadata driven design, Event driven approach and Publish-Subscribe Architecture
Provides Agile Data Provisioning by supporting Relational, Hierarchical, Flat Files, Big Data sources (Hive), Log based, semi-structured, and unstructured formats with all provisioning styles (batch, real-time, federation, event-based)
Can understand and provide different Data Formats (IDocs, XML, OData, JSON, Flat Files, SOAP etc.)
Scalable and Flexible for integrating new SAP & non SAP systems (on Premise, on Demand), Databases etc.
Data Governance with End to End Data Management services
Mass Data Handling Capabilities & Applications
Provides End to End Monitoring, Triggering, Tracking & Logging capabilities The connected systems are able to maintain context between various connected applications and maintain the Transactional Integrity.

The Toggle framework may have different Tables for storing the Metadata of different Integration scenarios in Database level. It gives the option to configure different integration scenarios between different source and target systems in the format in which the source and target systems understands. The mappings between different source and target systems are done in the Field level in the Database. It may support integration via the Data layer and in the Application layer.

When the Database transactions are created in the on premise or on demand system, the data may be sent to the Data governance system. The data is stored in the Persistency layer where the raw data formats (like Idoc, XML, OData etc.) is stored in the different database tables. The Persistency layer data is validated against the Rules for that particular Database object and against the Metadata repository. The Canonical layer is built by considering the Metadata repository and the Persistency layer data. The canonical data is independent of the source and Target systems (& Data Formats) and it acts like a Reference Data for that particular Database object (Account, Contact, Opportunity etc.).

The Active Database may be created using the Canonical Database and the Persistency Database. The Active Data Management Layer has the Active Data which is ready to be distributed to the Target systems. The Active Data Management Layer builds the target system records by considering the Metadata repository. The Data Publisher and the Distribution Layer creates the data for the Target systems by using the Active Database and identifies the Data format of the Target systems from the Metadata repository. This layer distributes the Data and logs the details in the Logging and Tracking Database. Options may be provided to retrigger the Data distribution for specific system if needed. There may be Monitoring capabilities in this layer which gives full transparency on Data movements between different systems in the network.

The Metadata Repository holds Metadata about all the different systems in the network, different Database objects, their Data formats, Subscribers information, Leading systems for different scenario's and different Database objects etc. The details of Metadata Repository may be stored in the Metadata Repository Database and the entries are maintained by a Technical user using the provided User Interface.

Data Governance Rules may be applied on the Canonical Database and the Active Database. The Data Governance supports with all the Data Management services. The Data Governance UI supports all governance options for all Database objects. The Data Governance Layer does the Central Rule Management for all the Database Objects from Multiple systems in the Database assembly network. The Rule repository holds all the rules applicable for different Database Objects in different systems in the network. The Rules can be maintained using the Rule Builder UI.

When the Framework ensure that incoming data is of adequate quality it distributes the data to the needed systems which has subscribed for that Database object from that particular system. The distribution is logged centrally to track the distribution to different systems in the Database assembly network.

The Canonical Data has different Database objects data which is built by considering the leading system for that particular database object in the Database assembly network. The Data is enriched by execution different rules against that particular record from the central rules repository. The data from different systems are stored in the Persistency layer and it is validated against the Canonical Data by different rules from the central Rule repository. When the validation is successful the Data is ready for distribution to the different receiving systems and the distribution is logged by the logging framework. When the data is successfully distributed the data is flagged in the Persistency Database and it is ready for archiving going forward. For example, when Accounts are created or changed from CRM it reaches the Data governance system and from there it is distributed to CFC. The same happens when the Accounts are created or changed from CFC system, i.e. it reaches the Data governance system and from there it is distributed to other systems that are subscribed for the creation & changes of an Account.

Integration of the on demand and the on premise systems may be done using Data Platform which exchanges both master data and transactional data in a bidirectional manner across the network. The framework supports Data Lifecycle Management for each Database object which can be customized as per Database requirements. We have Version Management capabilities for Database objects, Rules etc. Options are provided for Tracking the Database objects distribution and Error Handling during Data distribution.

For example, when a Field in Account Database object is changed in CRM on premise system it is distributed to the Data Governance system. The Data Governance systems checks for the subscribed systems for the changes of the Account and then it distributes the changes to the interested systems in the Database assembly network. It maintains the log of the distributed data object and the distributed systems also. If the data object is lost in transit means the options are provided to retransmit the data object again to that specific system also. The above approach supports both Full Replication and Delta Replication also. Based on the Customizing in the Toggle Framework, the Integration in done in Data level in tables or views (Data Layer Integration) and Application level (Application or process level Integration). The Data Layer Integration happens between tables in different schemas of same database or between tables in different schemas of different tenants of same database instance (MDC Scenario).

FIG. 7 shows an example of a database object 700 or data which may be placed into a database. Along with this is a list of interaction objects 702. These are activities which may be caused by the database integration system to be performed on various local databases of the at least three computing systems.

When a Source system (for Example SAP CRM) send a data record (IDoc) to the Data platform, the Format Identifier and Dispatcher (Data Dispatching Framework) identifies the received data format and routes the data record to the right Data Format Handler Adapters. The Data Format Handler Adapters can understand different data formats like IDoc, XML, OData. JSON, Files etc. The Data Format Handler Adapters sends the data to the Persistency Layer (Data Storage Framework).

The Persistency layer stores the raw data format in the persistency layer database tables. Using the persistency layer tables, the canonical layer is built by validating against the rules and with the data management services. The canonical layer data structures are independent of the source and target systems. The canonical layer database tables are used to create the Active data management layer which has the data to be distributed for the different Target systems.

The Canonical Database and the Active Database are used by the data management services. The Active data management layer sends the data to the Data Publisher and the Distribution layer which transmits the data format according to the receiving Target systems and sends the Data to the corresponding Data Distributor Adapters. It gets the subscribed Target system and the Data formats from the Metadata Repository Framework. The different layers like Active Data Management, Canonical, and Persistency etc. refer the Metadata Repository Framework for different services. The Data Distributor Adapters finally send the data to the subscribed Target systems in the Database assembly network. The Metadata Repository can be customized by the Technical user using the User Interface. The Distribution Layer takes care of the Logging & Tracking which can be monitored using the Administration UI. The Data Governance services can be triggered on the Active Data and the canonical Data using the Data Governance UI. The Rules are stored in the Central Rules Management Database which gets the rules from the Rule Builder UI.

The Data platform may offer one or more of the below capabilities which may be used for managing Master & Transaction data in an Database assembly network:
Database assembly Data Governance and Data Stewardship
Data Quality & Distribution Logic across systems
Message Queuing & Data Tracking
Error Handling & Resend Capabilities
Data lifecycle Management & Archiving
Metadata Management
System(s) of Record Definition
Central Logging
Data Distribution Reporting
Authorization Management
Central Reference Data Management
Central Rules Management
Automation of Enrichment & Augmentation
Automation of Validation & Matching
Mass Data maintenance
Workflow Management for Data approval processes
Best Record Management
Survivorship-Victim Forensics
Reporting & Analysis Capabilities
Central CRUD Management
Monitoring & Debugging Capabilities
Configuration & Administration of services
Data Transformation Management The described solution using the Data Integration and Governance Framework provides Scalable Architecture for on Demand & on Premise systems for Seamless Integration in an Database assembly network. It supports in Streamlining Data Governance Processes and thereby providing Operational Excellence. It reduces the Data Load across the entire system landscape. This Solution Approach helps new systems to be easily integrated in a limited timeframe for M & A and Shorten Time-to-Market This solution may be also helpful when the on premise system is deployed in the Headquarters of a Company and the OnDemand systems are deployed in the Subsidiaries and the same data is processed by different users in the onDemand & onPremise system.

The described solution using the leading system assumption will solve the requirements for bidirectional changes in an OD/OP system setup. Conflict situations are detected in a very efficient way. With the usage of Feeds we are able to inform the user if a data change was rejected by the leading system. Since OD/OP Integration is nearly "Real Time" we expect a low number of conflicts. This solution helps the users in onPremise and onDemand systems in a heterogeneous network to work on the same Data and ensure proper Data quality and Data consistency.

Figure 8:
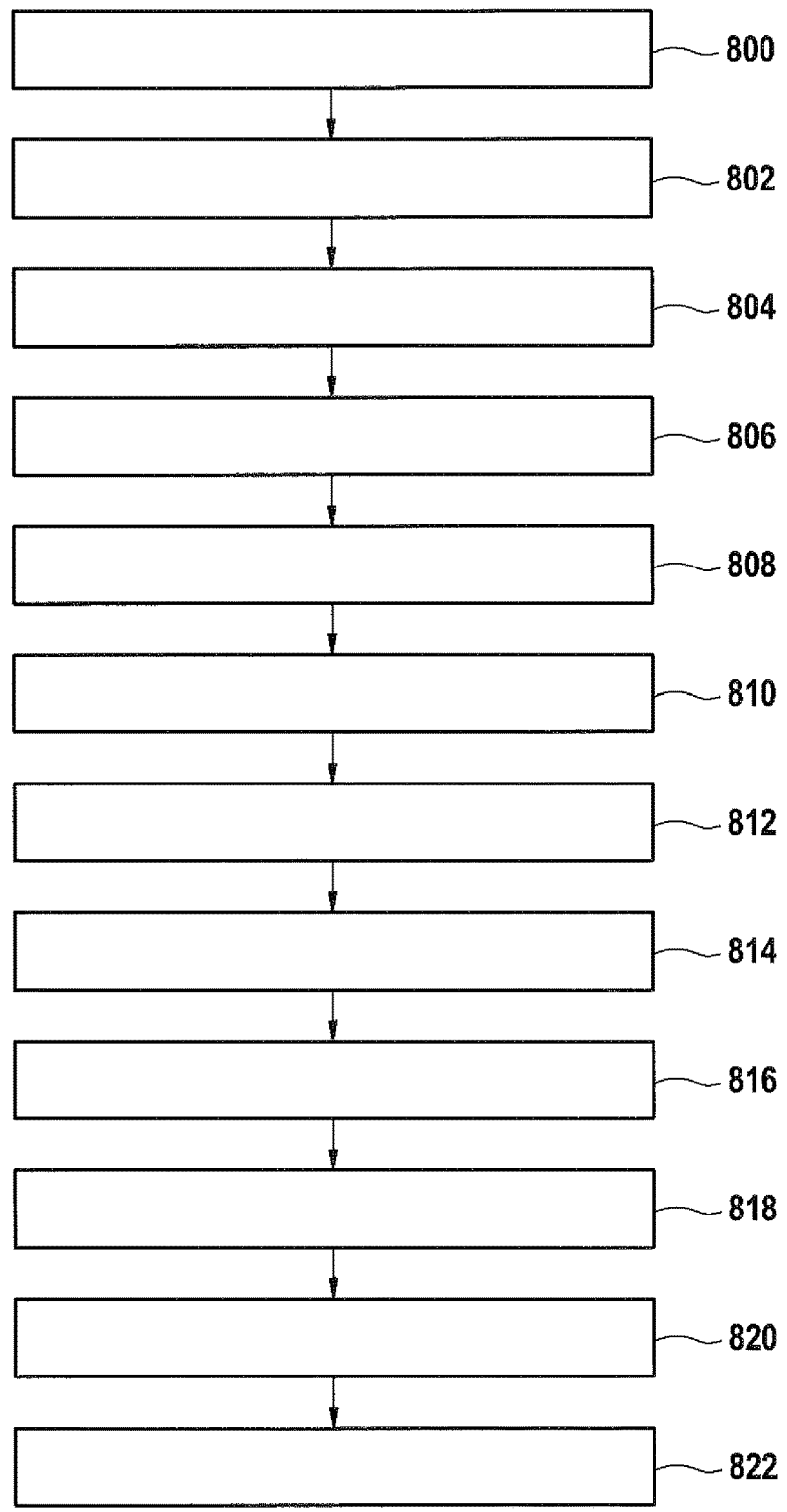
FIG. 8 shows a flow chart which illustrates an example of a method.

FIG. 8 shows a further example of a method.

Step 800 of FIG. 8 includes:
Document Owner creates a Database Document in a Sender system which is in secured zone, (Supported by UI Application layer components)

Step 802 of FIG. 8 includes:
The Document needs has to be distributed to different systems in different Technical formats across different network zones. (Supported by UI Application layer components)

1) The Document owner creates the Database Document and click the "save" button in a Sender system.
2) The Rules are maintained in the Central layer for doing the Field-level Validation & Address Validation for the Database Documents creation.
3) This event is send to the Data platform and it checks for the Database Document type.
4) Based on the Database Document type, it identifies the Integration Type, the system which needs this Document and the format it can understand.
5) The Data platform converts the Database Document in the specific format which can be understood by the Target receiving system(s).

Step 804 of FIG. 8 includes:
The Data platform tries to establish the connection with the different target systems (based on the Integration Type). This connection can be in the Application layer or in Data layer based on the Integration Type. When the connection is successful, it establishes a Service channel for the communication with the Target system(s).

1) The platform ensures the needed Master data in the Target systems before distributing the transaction data. Ex: Synchronization of customizing (i.e., value helpers) across connected systems.
2) When the needed Master data is missing in the Target system means it picks the needed Master data also for the Target system from the Sender system.
3) The Data Management Central Services layer does the Duplicate check in the Database layer level for the given Accounts or Contacts in order to avoid Duplicates in Master Data level.
4) The connection is established (Service Channel using DB Host, DB Port, user name & password) to the needed different systems in the network.
5) The Master data is synchronized to the Target system in the right format (The data format is identified from the Metadata Management Repository layer).
6) When the Master data is synchronized successfully, it checks for the Integration type for the transaction Database Document synchronization.

Step 806 of FIG. 8 includes:
The Toggle Framework decides the Integration type based on the following criteria like Message/Data Transfer Interval, Volume, initial loads/delta load scenario, Communication type like Synchronous or asynchronous transfer, size, Message Throughput etc., 1) Technically the Transaction context is maintained between multiple applications by a Root Transaction, Link Transaction & Routed Transaction,
2) The above are needed for maintaining a valid transaction context including session variables, Transaction Token to track the order of query execution between different Applications in a logical user session.

Step 808 of FIG. 8 includes:
The Root transaction is initiated by the User (the current transaction context) which triggers the Link Transaction based on the Request Type which is the first physical connection of a logical session and the context is tracked using the Transaction Token, session variables, metadata and stored in a Temporary table.

1) The order of query execution is tracked and stored Temporarily to have the whole transaction context to maintain the Transactional Integrity between multiple Applications running on a the same Database (by generating a Graph for different queries).
2) Based on the events created in Link Transaction, different Routed Transactions are getting created to ensure the needed Transactional Integrity of the Database Document.

Step 810 of FIG. 8 includes:

The entire Transaction context is tracked via the Transaction Token.
1) The Transactional data is synchronized to the Target system in the right format based on the Field mappings to different target systems (either in the Application layer or in the Data layer based on the Integration Type).
2) When the Transactional data is synchronized successfully it updates the flag in the Local tables in the Toggle Framework for Delivery update to the specified Target system Step 812 of FIG. 8 includes:

When any one of the target systems are down means the Data is stored temporarily in the Data platform unless the Target system is available.
1) The Toggle Framework updates the Sender system also about the Document Delivery to the corresponding Target systems.

Step 814 of FIG. 8 includes:

The Toggle Framework creates follow-up Documents from different Applications (ex: CRM, concur) using same or different database.
1) When the Application User creates a Database Document and when he creates any further Documents with respect to the initial parent document (either in the same system or in other system) the Interaction Object is automatically created to track the further Documents which are created as a reference to the Parent Document.
2) The Interaction Object can be customized to be created in the same system (like the parent document) or in the other system (in order to track the subsequence documents).
3) The Database objects, Interaction Object, the Follow-up documents are in the same system or in the different system based on the customization settings.

Step 816 of FIG. 8 includes:

Based on the Application User activities, the Interaction objects can be linked with different Database objects like Accounts, Contacts, Leads, Opportunity, Sales Order etc. Options are provided to activate Interaction objects for specific Database objects. Options are provided to create follow-up Documents from a specific Interaction objects also.
1) There are different details displayed when the Interaction Objects are linked with different Database objects. Options are provided to have specific attributes based on the linked Database object with the Interaction Object.)

Step 818 of FIG. 8 includes

This approach works even when the Framework is distributed between multiple systems in an Database assembly network. The Interaction Object can be used with Database Transaction from same or different systems (multiple systems) across a heterogeneous network. This helps to see the Predecessor and the Successor documents created from different Applications for the specific Database Document.

Step 820 of FIG. 8 includes:

When the Data Synchronization is successful with the Database Document, every required systems are notified that the Document are successfully distributed along with the needed dependent Documents
1) The Transaction session context is closed leaving the remote and main databases in a mutually consistent state (if the databases are different).
2) The connection with the different remote systems are closed & released.

Step 822 of FIG. 8 includes:

Finally the distributed Database Documents are notified to all the needed users from different systems so that the users can see the same from different systems based on their respective Authorizations.

LIST OF REFERENCE NUMERALS

100 database assembly
102 first computing system
104 second computing system
106 third computing system
108 database integration system
110 network connection
112 optional firewall
114 on demand system
116 at least one application
118 local database
120 network interface
122 processor
124 memory
126 update queue
130 first root transaction
132 first link transaction
134 first routed transaction for second computing system
136 first routed transaction for third computing system
138 first data mapping
140 machine executable instructions
200 receiving a first root transaction by the local database of a first computing system
202 executing the database transaction on the local database of the first computing system
204 generating a first link transaction by the local database of the first computing system
206 sending the first link transaction from the first computing system to the database integration system via the network connection of the first computing system
208 generating a first routed transaction for at least one of the first remaining computing systems
210 sending the first routed transaction to the at least one of the remaining computing systems via the network connection
212 executing the first routed transaction on the local database of the at least one of the remaining computer system
300 buffer
302 user interface
500 database pipe
600 application layer
602 database layer
604 data sources
606 smart data layer
700 database object

What is claimed is:

1. A method of using a database assembly, wherein the database assembly comprises at least three computing systems, wherein each of the at least three computing systems comprises at least one application and a local database, a database integration system, and a network connection between each of the at least three computing systems and the database integration system, wherein the method comprises:

receiving a first root transaction by the local database of a first computing system, wherein the first computing system is one of the at least three computing systems, and the first root transaction is a database transaction generated by the at least one application of the first computing system;

executing the first root transaction on the local database of the first computing system;
generating a first link transaction by the local database of the first computing system, wherein the first link transaction is descriptive of the first root transaction;
sending the first link transaction from the first computing system to the database integration system via the network connection of the first computing system;
generating a first routed transaction for at least one of first remaining computing systems by the database integration system, wherein the first remaining computing systems are the at least three computing systems excluding the first computing system, and the first routed transaction is generated using a first data mapping of the first link transaction to the local database of each of the at least one of the first remaining computing systems;
sending the first routed transaction to the at least one of the first remaining computing systems via the network connection;
executing the first routed transaction on the local database of the at least one of the first remaining computer systems;
generating an application command in response to the first link transaction by the database integration system, wherein the application command is generated using a set of criteria;
sending the application command to a selected computing system via the network connection, wherein the selected computing system is selected from the first remaining computing systems; and
executing the application command by the at least one application of the selected computing system.

2. The method of claim 1, wherein the database integration system comprises at least one update queue for holding routed transactions before sending the routed transactions to the at least three computing systems, wherein the routed transactions comprise the first routed transaction for each of the at least one of the first remaining computing systems.

3. The method of claim 2, wherein each of the at least three computing systems has a priority rating, and the method further comprises ordering the at least one update queue according to the priority rating.

4. The method of claim 2, wherein generating the first link transaction comprises generating a first time stamp for the first link transaction, and the method further comprises:
receiving a second root transaction by the local database of a second computing system, wherein the second computing system is one of the first remaining computing systems, and the second root transaction is a database transaction generated by the at least one application of the second computing system;
executing the second root transaction on the local database of the second computing system;
generating a second link transaction by the local database of the second computing system, wherein the second link transaction is descriptive of the second root transaction, and generating the second link transaction comprises generating a second time stamp for the second link transaction;
sending the second link transaction from the second computing system to the database integration system via the network connection of the second computing system;
generating a second routed transaction for at least one of second remaining computing systems by the database integration system, wherein the second remaining computing systems are the at least three computing systems excluding the second computing system, and the second routed transaction is generated using a second data mapping of the second link transaction to the local database of each of the at least one of the second remaining computing systems;
adding the second routed transaction to the at least one update queue for sending the second routed transaction to each of the second remaining computing systems via the network connection; and
ordering the first routed transaction and the second routed transaction in the at least one update queue using the first time stamp and the second time stamp.

5. The method of claim 4, wherein the method further comprises deleting one of the first routed transaction and the second routed transaction from the at least one update queue according to at least one rule if the first time stamp and the second time stamp occur within a certain time period.

6. The method of claim 5, wherein the method further comprises sending a queue deletion method from the database integration system to one of the first computing system and the second computing system that generated the deleted one of the first routed transaction and the second routed transaction.

7. The method of claim 4, wherein each of the first routed transaction and the second routed transaction within the at least one update queue has a target system selected from the at least three computing systems, and the method further comprises:
keeping a failed transaction in an update buffer if sending to the target system fails;
polling the target system if sending to the target system fails; and
resending the failed transaction when the polling of the target system is successful.

8. The method of claim 7, wherein the target system is an on demand computing system, and the method further comprises keeping the failed transaction in an on demand system buffer until the on demand computing system is instantiated.

9. The method of claim 8, wherein the on demand computing system is instantiated as a virtual machine by an on demand system, and the on demand computing system is instantiated by a request from a user interface to the on demand system.

10. The method of claim 7, wherein each of the first routed transaction and the second routed transaction within the at least one update queue has an originating system selected from the at least three computing systems, and the method further comprises notifying the originating system when successful transactions are accepted by the target system.

11. The method of claim 10, wherein the method further comprises:
deleting a routed transaction from the at least one update queue in response to certain criteria is-being fulfilled; and
notifying the originating system in response to the routed transaction being deleted from the at least one update queue.

12. The method of claim 1, wherein the method further comprises sending a successful execution message to the first computing system in response to the execution of the first routed transaction on the local database of the at least one of the first remaining computer systems being successful.

13. The method of claim 1, wherein the method further comprises generating the first routed transaction for a selected system of the first remaining computing systems only if the first data mapping indicates that the first routed transaction is relevant for the selected system.

14. The method of claim 1, wherein the first routed transaction comprises a database tunnel routing between the local database of the first computing system and the local database of the at least one of the first remaining computer systems, and executing the first routed transaction on the local database of the at least one of the first remaining computer systems comprises:
- establishing a database tunnel between the local database of the first computing system and the local database of the at least one of the first remaining computer systems; and
- synchronizing the local database of the at least one of the first remaining computer systems with the local database of the first computing system via the database tunnel.

15. The method of claim 1, further comprising searching a data mapping library stored on a memory of the database integration system for the first data mapping in response to receiving the first link transaction.

16. The method of claim 15, further comprising generating the first data mapping by the database integration system using a data mapping algorithm if the first data mapping is not found in the data mapping library.

17. The method of claim 16, wherein the data mapping algorithm incorporates any one of Intelligent mapping, machine learning, Natural Language Processing, Deep Learning, Graph Theory, Deep Linguistic processing, Neural Networks, Natural Language Understanding, Machine Translation, and combinations thereof.

18. A system of a database assembly, wherein the system of the database assembly comprises:
- at least three computing systems, wherein each of the at least three computing systems comprises at least one application and a local database;
- a database integration system; and
- a network connection between each of the at least three computing systems and the database integration system;

wherein the system of the database assembly includes a memory and a processor configured to
- receive a first root transaction by the local database of a first computing system, wherein the first computing system is one of the at least three computing systems, and the first root transaction is a database transaction generated by the at least one application of the first computing system;
- execute the first root transaction on the local database of the first computing system;
- generate a first link transaction by the local database of the first computing system, wherein the first link transaction is descriptive of the first root transaction;
- send the first link transaction from the first computing system to the database integration system via the network connection of the first computing system;
- generate a first routed transaction for at least one of first remaining computing systems by the database integration system, wherein the first remaining computing systems are the at least three computing systems excluding the first computing system, and the first routed transaction is generated using a first data mapping of the first link transaction to the local database of each of the at least one of the first remaining computing systems;
- send the first routed transaction to the at least one of the first remaining computing systems via the network connection;
- execute the first routed transaction on the local database of the at least one of the first remaining computer systems;
- generate an application command in response to the first link transaction by the database integration system, wherein the application command is generated using a set of criteria;
- send the application command to a selected computing system via the network connection, wherein the selected computing system is selected from the first remaining computing systems; and
- execute the application command by the at least one application of the selected computing system.

* * * * *